(12) United States Patent
Fuente et al.

(10) Patent No.: US 7,219,256 B2
(45) Date of Patent: May 15, 2007

(54) METHOD AND APPARATUS FOR CONTROLLING DATA STORAGE WITHIN A DATA STORAGE SYSTEM

(75) Inventors: Carlos F. Fuente, Portsmouth (GB); Thomas W. Rickard, Timsbury (GB); William J. Scales, Portchester (GB)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/839,645

(22) Filed: May 5, 2004

(65) Prior Publication Data

US 2005/0102582 A1 May 12, 2005

(30) Foreign Application Priority Data

Nov. 12, 2003 (GB) .................. 0326293.8

(51) Int. Cl.
*G06F 11/00* (2006.01)
(52) U.S. Cl. ............................ 714/5; 714/9
(58) Field of Classification Search .............. 714/5, 714/9
See application file for complete search history.

(56) References Cited

U.S. PATENT DOCUMENTS

| | | | | |
|---|---|---|---|---|
| 5,379,276 A | * | 1/1995 | Igami et al. ................. 711/118 |
| 5,524,234 A | * | 6/1996 | Martinez et al. ............. 711/141 |
| 5,790,775 A | * | 8/1998 | Marks et al. .................. 714/9 |
| 6,438,647 B1 | * | 8/2002 | Nielson et al. .............. 711/113 |
| 7,062,675 B1 | * | 6/2006 | Kemeny et al. ............... 714/15 |
| 2001/0049768 A1 | * | 12/2001 | Kato et al. ................... 711/113 |
| 2003/0084252 A1 | * | 5/2003 | Talagala ..................... 711/135 |
| 2004/0162950 A1 | * | 8/2004 | Coulson ..................... 711/141 |

FOREIGN PATENT DOCUMENTS

GB 000597729 A1 * 5/1994

* cited by examiner

*Primary Examiner*—Michael C. Maskulinski
(74) *Attorney, Agent, or Firm*—Dillon & Yudell LLP

(57) ABSTRACT

A host data processing system includes a data storage system having a cache memory and a back end storage. In response to a detection of an event failure during an input/output (I/O) request from the host data processing system to the data storage system, the data associated with the I/O request is forwarded to the back end storage data, and a copy of the data associated with the I/O request is sent to the cache memory. A determination is made as to whether or not there is an acknowledgement from the back end storage regarding the receipt of the data associated with the I/O request. If there is an acknowledgement from the back end storage regarding the receipt of the data associated with the I/O request, the data associated with the I/O request is flushed from the cache memory, and the received acknowledgement is routed to the host data processing system.

10 Claims, 8 Drawing Sheets

METHOD AND APPARATUS FOR CONTROLLING DATA STORAGE WITHIN A DATA STORAGE SYSTEM

RELATED PATENT APPLICATION

The present patent application claims priority to copending United Kingdom application Serial No. 0326293.8, filed on Nov. 12, 2003.

BACKGROUND OF THE INVENTION

1. Technical Field

The present invention relates to data storage systems in general, and in particular to controllers within data storage systems. Still more particularly, the present invention relates to a controller for controlling data storage within a data storage system.

2. Description of Related Art

A data processing system typically includes a processor subsystem having at least one central processing unit (CPU), an input/output (I/O) subsystem, a memory subsystem and a bus subsystem. The memory subsystem of the data processing system typically includes a data storage system having a controller connected to a back end storage. The controller controls the flow of data between the data processing system and the back end storage. The controller includes a cache memory that is typically implemented by static memories. During operation, the cache memory serves as a temporary store for data associated with a write I/O request.

Some controllers have two cache memories. The two cache memories can be operated in a flip-flop manner in which one cache memory is being loaded with data from the data processing system while the other cache memory flushes data to the back end storage. Alternatively, the two cache memories can be operated in a mirrored manner in which each cache memory stores a copy or image of the data before the acknowledgement is returned to the data processing system. The two cache memories are designed so that the risk of failure of or loss of access to both images is minimized.

For the most part, prior art data storage systems do not readily meet the increasingly stringent reliability demands and failure tolerances imposed by many software applications. In particular, responses to I/O requests in such data storage systems can be poorly defined in the wake of a failure that disrupts the processing of I/O requests. Accordingly, it would be desirable to improve the failure tolerance of data storage systems without compromising reliability and data availability.

SUMMARY OF THE INVENTION

In accordance with a preferred embodiment of the present invention, a host data processing system includes a data storage system having a cache memory and a back end storage. In response to a detection of an event failure during an input/output (I/O) request from the host data processing system to the data storage system, the data associated with the I/O request is forwarded to the back end storage data, and a copy of the data associated with the I/O request is sent to the cache memory. A determination is made as to whether or not there is an acknowledgement from the back end storage regarding the receipt of the data associated with the I/O request. If there is an acknowledgement from the back end storage regarding the receipt of the data associated with the I/O request, the data associated with the I/O request is flushed from the cache memory, and the received acknowledgement is routed to the host data processing system. If there is no acknowledgement from the back end storage regarding the receipt of the data associated with said I/O request, another determination is made as to whether or not a retry operation is required.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
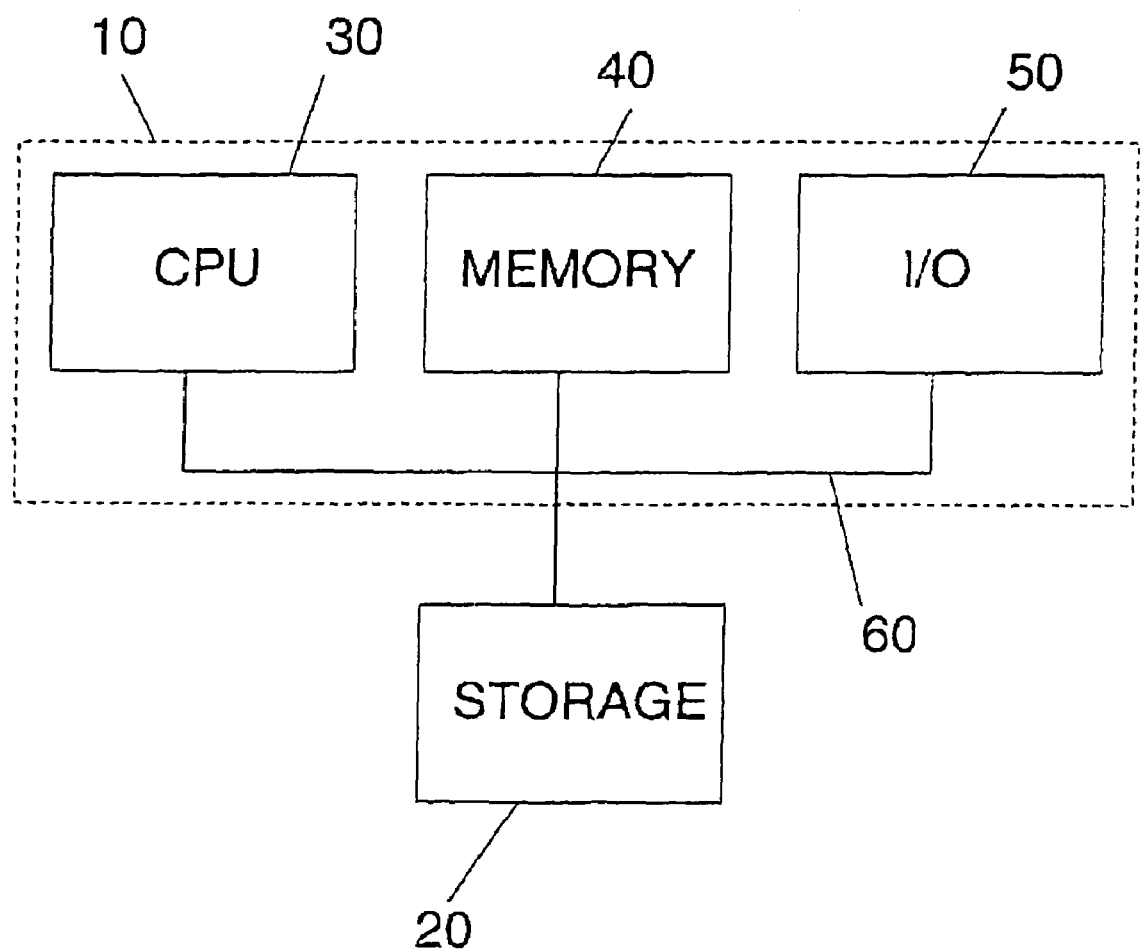
FIG. 1 is a block diagram of a data processing system.

Referring now to the drawings and in particular to FIG. 1, there is depicted a block diagram of a host data processing system, in accordance with a preferred embodiment of the present invention. As shown, a host data processing system 10 includes a processor subsystem having a central processing unit (CPU) 30, a memory subsystem 40, an input/output (I/O) subsystem 50 and a bus subsystem 60. Bus subsystem 60 interconnects CPU 30, memory subsystem 40 and I/O subsystem 50. Memory subsystem 40, which stores software executable by CPU 30, is connected to a data storage system 20.

Figure 2:
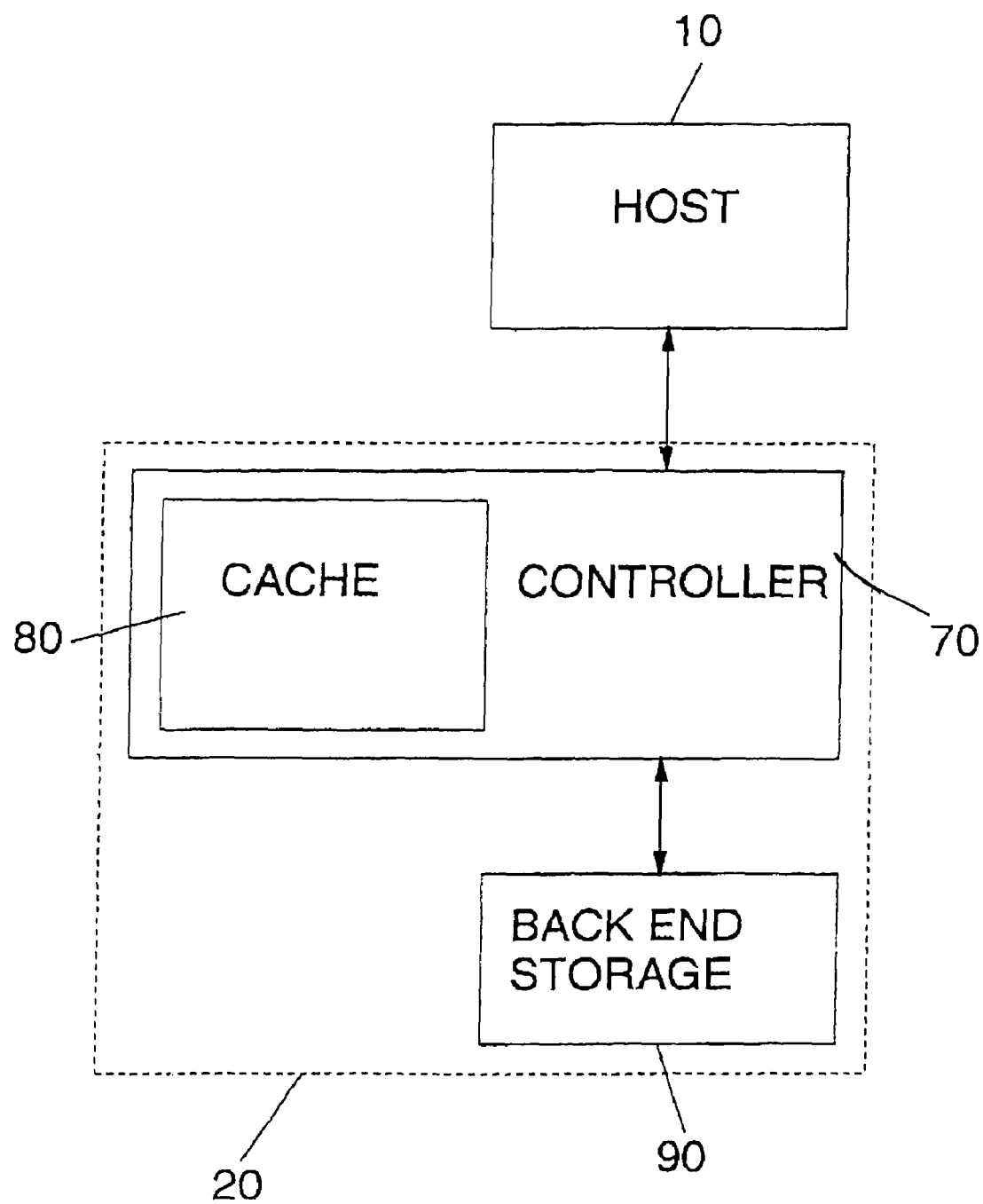
FIG. 2 is a block diagram of a data storage system within the data processing system from FIG. 1.

With reference now to FIG. 2, there is depicted a block diagram of data storage system 20. As shown, data storage system 20 includes a controller 70 connected to a back end storage 90 and to a cache subsystem 80. Back end storage 90 includes one or more mass storage devices such as hard disk drives. Cache subsystem 80 may be integrated within controller 70. Alternatively, cache subsystem 80 may be external to controller 70 and connected thereto. Cache subsystem 80 is preferably implemented by SDRAMs (not shown). It is understood by those skilled in the art that cache subsystem 80 may be implemented with solid state devices, such as SDRAMs, and/or moving storage devices.

Figure 3:
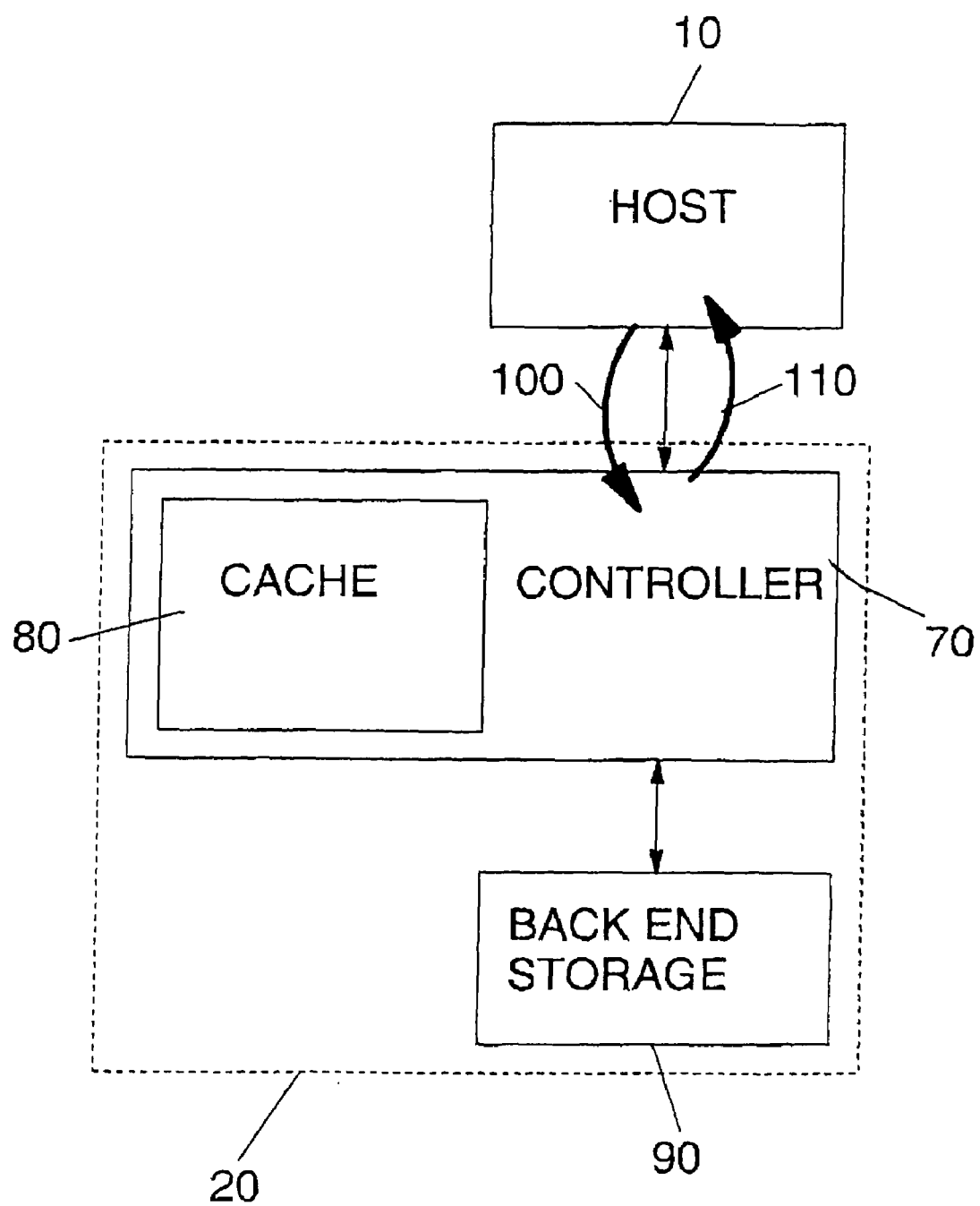
FIG. 3 is a block diagram of the data storage system from FIG. 2 showing write I/O request and acknowledgement data flows.

As shown in FIG. 3, the flow of data between host data processing system 10 and back end storage 90 in data storage system 20 is controlled by controller 70. Data storage system 20 accepts data to be stored from host data processing system 10 via a write I/O request 100. Write I/O request 100 may be generated by the software executing within host data processing system 10. The software generating the write I/O request can be either an operating system software or an application software. Write I/O request 100 is then processed within data storage system 20 by controller 70. After the receipt of an acknowledgement 110 for the completion write I/O request 100, host data processing system 10 is then informed that write I/O request 100 has been fulfilled.

Figure 4:
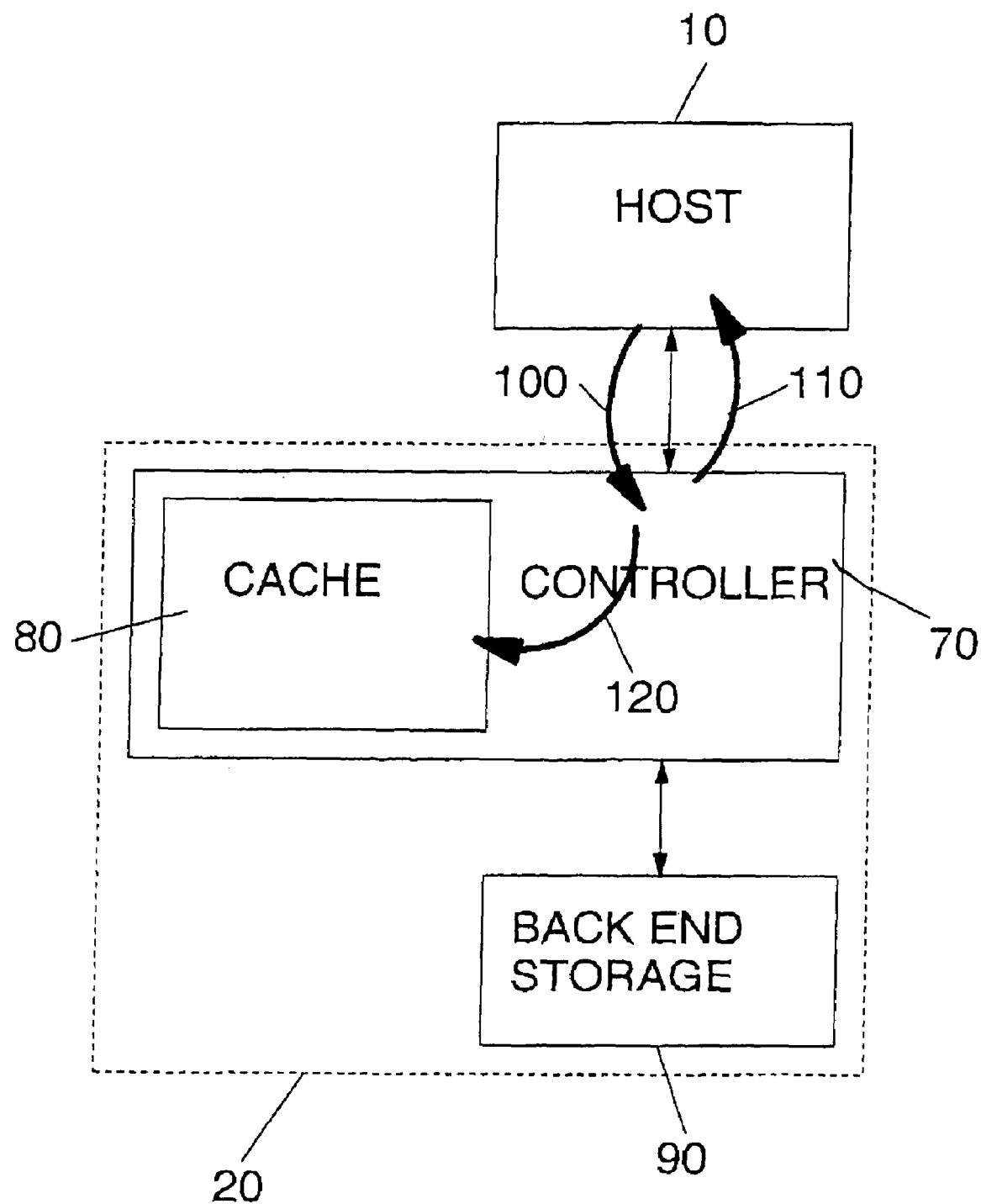
FIG. 4 is a block diagram of the data storage system from FIG. 2 showing write I/O request, acknowledgement, and caching data flows.

Under normal operation conditions, cache subsystem 80 serves as a non-volatile, temporary storage for the data associated with write I/O request 100 from host data processing system 10. Acknowledgement 110 is sent from controller 70 to host data processing system 10 once the data associated with write I/O request 100 has been stored in cache subsystem 80, as depicted by data flow 120 in FIG. 4.

Figure 5:
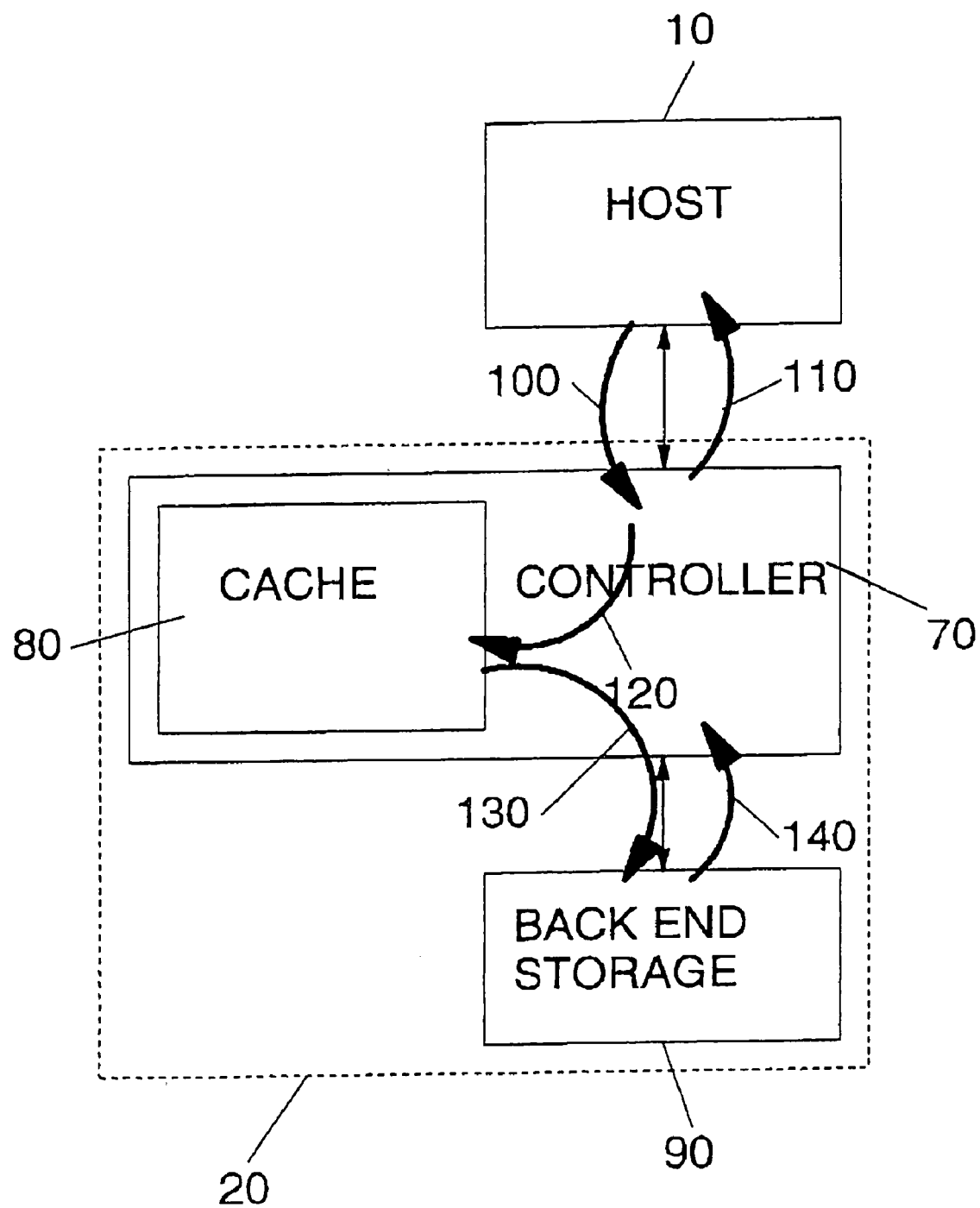
FIG. 5 is a block diagram of the data storage system from FIG. 2 showing write I/O request, acknowledgement, caching, and back end storage data flows.

The cached data in cache subsystem 80 is subsequently flushed from cache subsystem 80 to back end storage 90 at a convenient time later, as depicted by data flow 130 in FIG. 5. Upon the receipt of flushed data from cache subsystem 80, back end storage 90 sends an acknowledgement 140 to controller 70. In response to acknowledgement 140 from back end storage 90, controller 70 clears cache subsystem 80 in preparation for the next write I/O request from host data processing system 10.

Sometimes, write operations between host data processing system 10, controller 70, and back end storage 90 may be disrupted by an event failure. Examples of an event failure may include, without limitation, a host server failure, a kernel failure, an application failure, a storage controller failure, a network failure, etc. Any of the event failures may be associated with a power failure.

Figure 6:
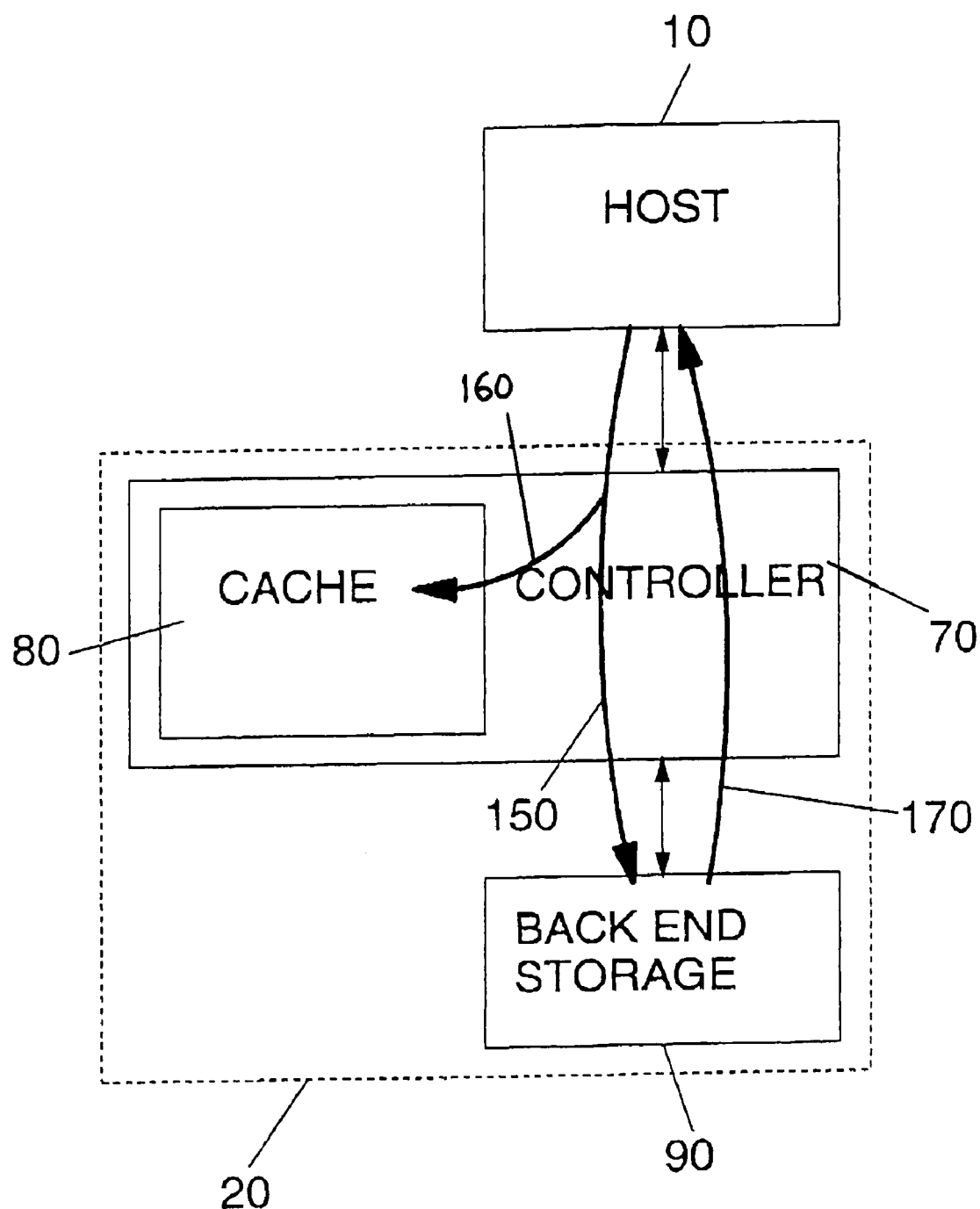
FIG. 6 is a block diagram of the data storage system from FIG. 2 showing modified write-through data flows.

Upon the detection of an event failure, controller 70 enters a modified write-through mode. During the modified write-through mode, as depicted in FIG. 6, data associated with a write I/O request 150 from host data processing system 10 is forwarded by controller 70 directly to back end storage 90. However, before forwarding write I/O request 150 to back end storage 90, controller 70 stores a copy of the data associated with write I/O request 150 in cache subsystem 80, as depicted by data flow 160. Upon the receipt of the data associated with write I/O request 150 from controller 70, back end storage 90 sends an acknowledgement 170 to controller 70. Controller 70 forwards acknowledgement 170 received from back end storage 90 to host data processing system 10.

After the receipt of acknowledgement 170 from back end storage 90, controller 70 clears cache subsystem 80 in preparation for the next write I/O request from host data processing system 10. Thus, a copy of the data associated with write I/O request 150 to be stored in back end storage 90 is stored in cache subsystem 80 before write I/O request 150 is issued to back end storage 90. The copy of the data associated with write I/O request 150 is then deleted only after the data associated with write I/O request 150 have been successfully stored in back end storage 90. In the event of a failure, a retry operation is performed. During the retry operation, any write I/O request for which no acknowledgement was received from back end storage 90 is repeated from the recorded copy. Thus, any outstanding data can be written from the recorded copy to back end storage 90. Details of the retry operation will be further discussed.

Figure 7:
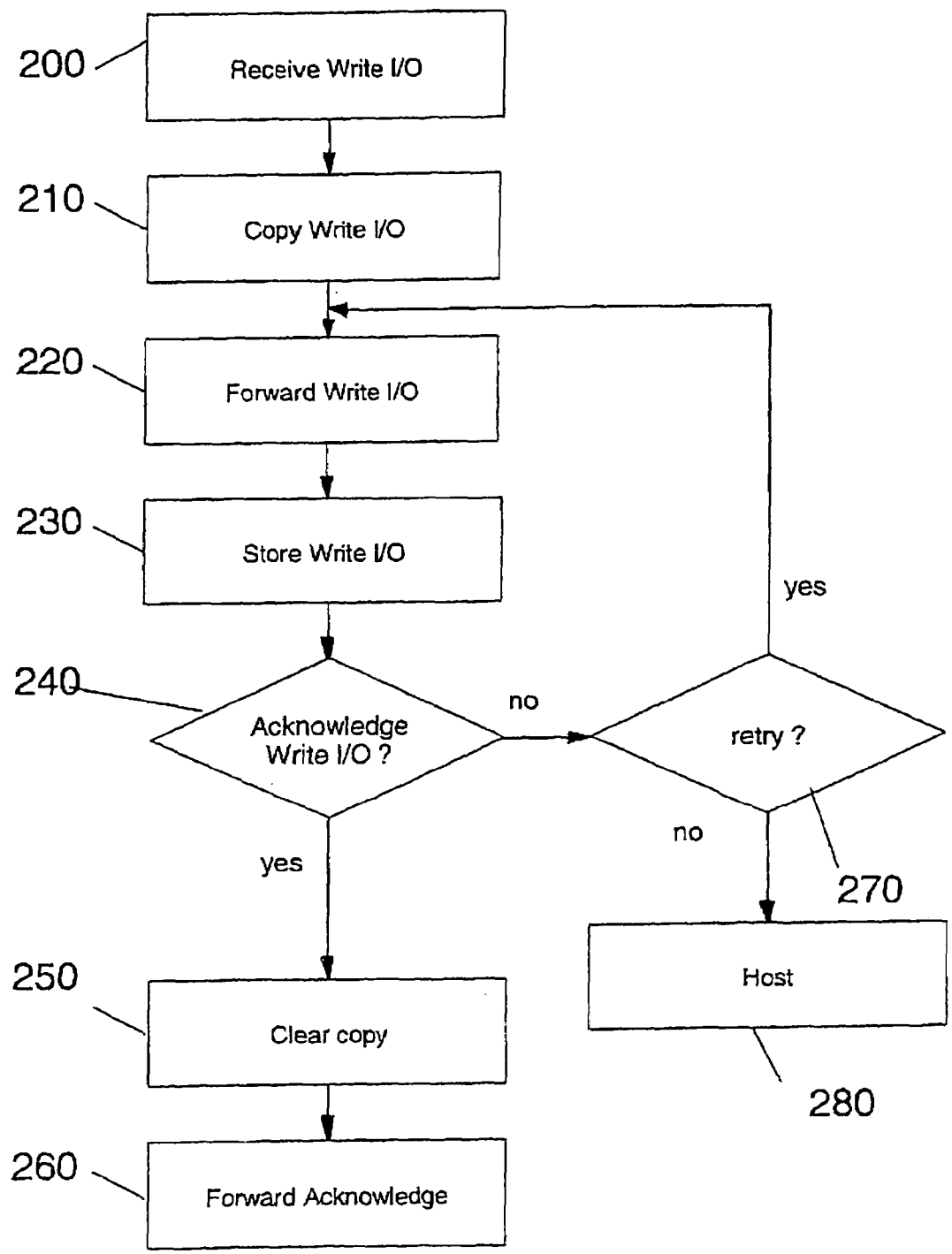
FIG. 7 is a high-level logic flow diagram of the execution steps during a modified write-through mode for the data storage system from FIG. 2.

Referring now to FIG. 7, there is depicted a high-level logic flow diagram of the execution steps during a modified write-through mode for data storage system 20. Initially, write I/O request 150 is received by controller 70 from host data processing system 10, as shown in block 200. Controller 70 then makes a copy of the data associated with write I/O request 150 in cache subsystem 80, as depicted in block 210. Next, the data associated with write I/O request 150 is forwarded by controller 70 to back end storage 90, as shown in block 220. The data associated with write I/O request 150 is stored in back end storage 90, as depicted in block 230. Once the data associated with write I/O request 150 have been stored, back end storage 90 sends acknowledgement 170 to controller 70. Controller 70 then determines if acknowledgement 170 has been received from back end storage 90, as shown in block 240. In response to the receipt of acknowledgement 170, controller 70 clears the copy of data from cache subsystem 80, as shown in block 250. Controller 70 then forwards acknowledgement 170 received from back end storage 90 to host data processing system 10, as shown in block 260. If no acknowledgement is received within a predetermined time interval, then controller 70 determines whether or not a retry operation needs to be performed, as shown in block 270. If no retry operation needs to be performed, controller 70 notifies host data processing system 10 of the event failure, as shown in block 280. Otherwise, the process returns to block 220.

Different embodiments of present invention may employ different tests for determining whether or not a retry operation should be performed. In a preferred embodiment of present invention, a predetermined number of retry operations are permitted by controller 70 before controller 70 notifies host data processing system 10 of an event failure. In another preferred embodiment of present invention, controller 70 permits retry operations for a predetermined period of time before controller 70 notifies host data processing system 10 of an event failure.

Figure 8:
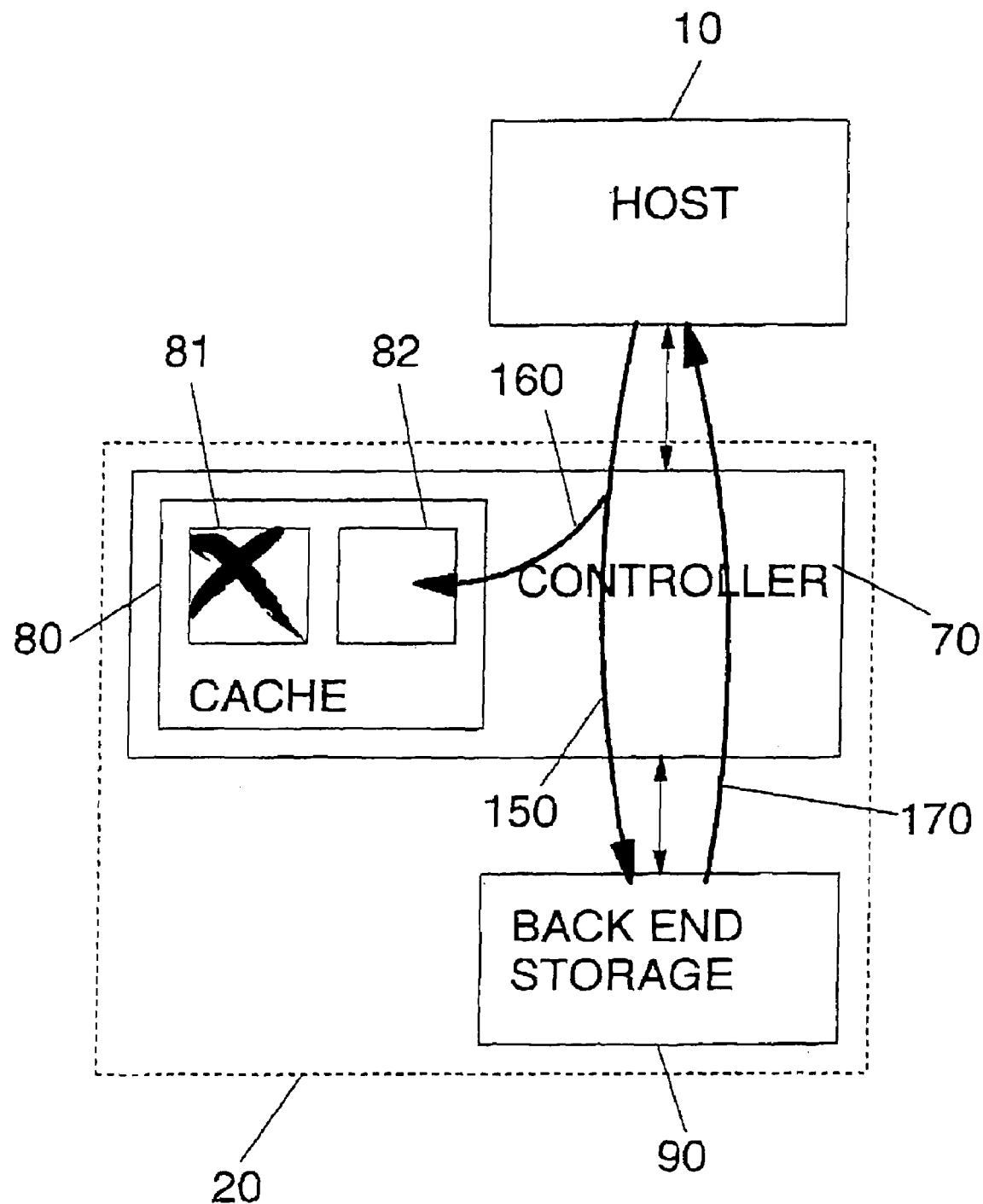
FIG. 8 is a block diagram of a data storage system having a controller with two cache memories.

In a preferred embodiment of the present invention, data associated with write I/O request 150 is copied into cache subsystem 80 before forwarding to back end storage 90. In an alternative embodiment of present invention, forwarding and copying (as depicted in blocks 210 and 220 in FIG. 7) may be performed simultaneously. Cache subsystem 80 may contain a single cache memory or multiple cache memories such as a first cache 81 and a second cache 82, as shown in FIG. 8. First cache 81 and second cache 82 can be operated in a flip-flop manner in which one cache is loaded with data from host data processing system 10 while data previously loaded into other is flushed to back end storage 90. Alternatively, first cache 81 and second cache 82 can be operated in a mirrored manner in which each of first cache 81 and second cache 82 stores a copy or image of data before acknowledgement 170 is returned to host data processing system 10. First cache 81 and second cache 82 are designed so that the risk of failure or loss of access to both images is minimized.

In the event that one of first cache 81 and second cache 82 fails, controller 70 enters the modified write-through mode. In the example here, second cache 82 remains operational after the failure of first cache 81. In the modified write-through mode, data associated with write I/O request 150 from host data processing system 10 is forwarded by controller 70 directly to back end storage 90. However, controller 70 also stores a copy of the data in second cache 82. Back end storage 90 sends acknowledgement 170 to controller 70 upon the receipt and storage of the data from controller 70. Controller 70 forwards acknowledgement 170 received from back end storage 90 to host data processing system 10. Upon the receipt of acknowledgement 170 from back end storage 90, controller 70 clears second cache 82. It is understood by those skilled in the art that cache subsystem 80 may also be implemented by one or more mass storage devices such as hard disk drives. Such mass storage devices may be external to back end storage 90. Alternatively, such devices may be integral to back end storage 90. The latter may be particularly preferable where back end storage includes a RAID array.

Embodiments of the present invention are particularly desirable for maintaining data read stability in a data storage system. This is especially useful in data processing systems executing failure tolerant software such as journalled file systems and databases, where the data storage system is expected to recover from failure modes in a timely manner without loss of data and with well-defined semantics for subsequent I/O activities.

As has been described, the present invention provides a controller for controlling data storage within a data storage system.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for controlling data storage in a data storage system having a cache memory and a back end storage, said method comprising:
   in response to a detection of an event failure during an input/output (I/O) request from a host data processing system to said data storage system,
      sending a copy of data associated with said I/O request to said cache memory, and
      forwarding said data associated with said I/O request to said back end storage data;
   determining whether or not there is an acknowledgement from said back end storage regarding the receipt of said data associated with said I/O request; and
   in response to a determination that there is an acknowledgement from said back end storage regarding the receipt of said data associated with said I/O request,
      flushing said data associated with said I/O request from said cache memory; and
      routing said acknowledgement to said host data processing system;
   in response to a determination that there is no acknowledgement from said back end storage regarding the receipt of said data associated with said I/O request, determining whether or not a retry operation needs to be performed; and
   in response to a determination that no retry operation is needed, notifying said host data processing system of said event failure.

2. The method of claim 1, wherein said method further includes in response to a determination that a retry operation is needed, repeating said sending and forwarding.

3. The method of claim 2, wherein said repeating further includes repeating said sending for a predetermined number of repeated failures.

4. The method of claim 2, wherein said repeating further includes repeating said sending for a predetermined period of time.

5. The method of claim 1, wherein said sending and forwarding are performed substantially simultaneously.

6. A controller for controlling data storage in a data storage system having a cache memory and a back end storage, said controller comprising:
   in response to a detection of an event failure during an input/output (I/O) request from a host data processing system to said data storage system,
      means for sending a copy of data associated with said I/O request to said cache memory, and
      means for forwarding said data associated with said I/O request to said back end storage data;
   means for determining whether or not there is an acknowledgement from said back end storage regarding the receipt of said data associated with said I/O request; and
   in response to a determination that there is an acknowledgement from said back end storage regarding the receipt of said data associated with said I/O request,
      means for flushing said data associated with said I/O request from said cache memory; and
      means for routing said acknowledgement to said host data processing system;
   in response to a determination that there is no acknowledgement from said back end storage regarding the receipt of said data associated with said I/O request, means for determining whether or not a retry operation needs to be performed; and
   in response to a determination that no retry operation is needed, means for notifying said host data processing system of said event failure.

7. The controller of claim 6, wherein said controller further includes in response to a determination that a retry operation is needed, means for repeating said sending and forwarding.

8. The controller of claim 7, wherein said means for repeating further includes means for repeating said sending for a predetermined number of repeated failures.

9. The controller of claim 7, wherein said means for repeating further includes means for repeating said sending for a predetermined period of time.

10. The controller of claim 6, wherein said means for sending and said means for forwarding are performed substantially simultaneously.

* * * * *